United States Patent [19]

Tsujimura et al.

[11] Patent Number: 4,834,591

[45] Date of Patent: May 30, 1989

[54] INDEXABLE CUTTER INSERT

[75] Inventors: Osamu Tsujimura, Kawasaki; Masaaki Nakayama, Tokyo; Masayuki Okawa, Kawasaki, all of Japan

[73] Assignee: Mitsubishi Kinzoku Kabushiki Kaisha, Tokyo, Japan

[21] Appl. No.: 164,443

[22] Filed: Mar. 4, 1988

[30] Foreign Application Priority Data

Mar. 4, 1987 [JP] Japan ................................. 62-31257

[51] Int. Cl.$^4$ ............................................. B23C 5/02
[52] U.S. Cl. ..................................... 407/113; 407/114
[58] Field of Search .................... 407/54, 65, 113, 114

[56] References Cited

U.S. PATENT DOCUMENTS

| 4,132,493 | 1/1979 | Hosoi. | |
|---|---|---|---|
| 4,411,564 | 10/1983 | Johnson | 407/113 |
| 4,512,689 | 4/1985 | Bylund | 407/40 |
| 4,556,345 | 12/1985 | Philippi | 407/114 |
| 4,566,827 | 1/1986 | Neumueller | 407/42 |
| 4,618,296 | 10/1986 | Allaire et al. | 407/42 |
| 4,693,641 | 9/1987 | Tsujimura et al. | 407/42 |
| 4,699,549 | 10/1987 | Shimomura et al. | 407/42 |
| 4,714,383 | 12/1987 | Shimomura et al. | 407/42 |

FOREIGN PATENT DOCUMENTS

| 59-15767 | 4/1984 | Japan. | |
|---|---|---|---|
| 59-21724 | 5/1984 | Japan. | |
| 59-21725 | 5/1984 | Japan. | |
| 214501 | 12/1984 | Japan | 407/113 |
| 61-134812 | 8/1986 | Japan. | |
| 63-57114 | 3/1988 | Japan. | |

Primary Examiner—Frederick R. Schmidt
Assistant Examiner—William E. Terrell
Attorney, Agent, or Firm—Cushman, Darby & Cushman

[57] ABSTRACT

An indexable cutter insert for a rotary cutter includes a plate defined by a front face, a rear face generally parallel to said front face and plural pairs of first and second side faces disposed alternately and lying between the front and rear faces. Each side face extends generally perpendicular to the front and rear faces. Each first side face is longer than each second side face and is generally arcuately convex as viewed in a direction perpendicular to the front face while each second side face is generally planar. The plate has a plurality of generally arcuate convex front cutting edges each defined by the intersection of a respective one of the first side faces with the front face and a plurality of generally arcuate convex rear cutting edges each defined by the intersection of a respective one of the first side faces with the rear face. A front marginal surface portion of the front face disposed adjacent to and extending along each second side face is convexly curved so as to slope toward the rear face toward the second side face while a rear marginal surface portion of the rear face disposed adjacent to and extending along each second side face is convexly curved so as to slope toward the front face toward the second side face.

2 Claims, 3 Drawing Sheets

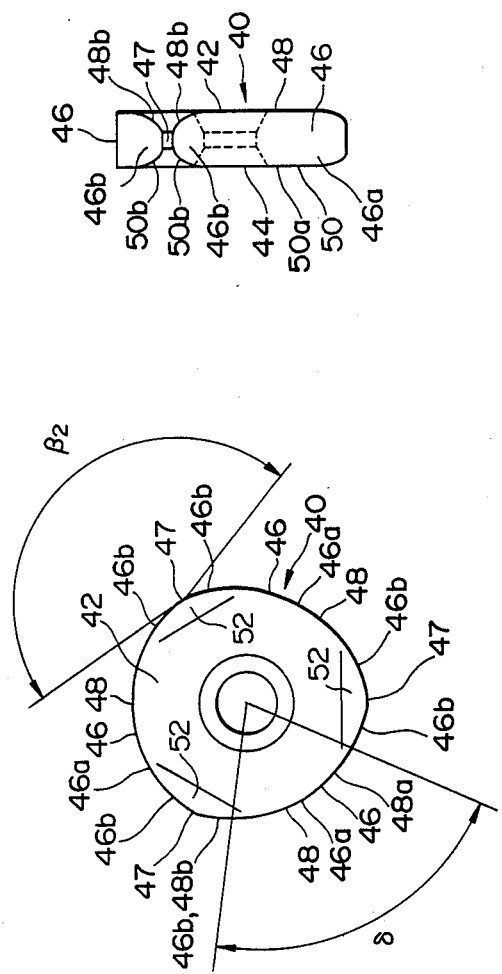

INDEXABLE CUTTER INSERT

BACKGROUND OF THE INVENTION

1. Field of the Invention

The present invention pertains to indexable cutter inserts for a rotary cutter such as a ball end mill.

2. Prior Art

In a rotary cutter such as a ball end mill and a drill bit, the cutting edge undergoes a great cutting load at its leading end portion disposed adjacent to an axis of rotation of a cutter body since the cutting speed is relatively low in the vicinity of the axis of rotation. As a result, the cutting edge is susceptible to damage or chipping at its leading end portion. Accordingly, in recent years, various cutter inserts of such a type that the strength of the cutting edge has been enhanced by modifying the shape of the leading end portion have been developed. FIGS. 1 and 2 show one such conventional cutter insert as disclosed in Published Examined Japanese Patent Application No. 59-21725. The insert 100 comprises a plate-like body defined by a front face 102, a rear face 104 and a side periphery lying between the front and rear faces 102 and 104. A pair of opposite notches 106 of a generally V-shape are formed in the side periphery to interrupt the side periphery to provide a pair of opposite side faces 108. Each of the V-shaped notches 106 extends from the front face 102 to the rear face 104 and is defined by a pair of first and second opposed walls 110 and 112. The first wall 110 is flat and perpendicular to the front face 102 while the second wall 112 is convexly curved when viewed in a direction perpendicular to the first wall 110. Each of the side faces 108 assumes a generally quadrantal shape when viewed in a direction perpendicular to the front face 102, and cooperates with the front face 102 and the second wall 110 of the notch 106 to define a cutting edge 114 which is convexly arcuate as viewed in the same direction. A marginal portion of the front face 102 and the second wall 112 disposed adjacent to and extending along each cutting edge 114 serves as a rake surface. Each arcuate convex side face 108 serves as a flank for the cutting edge 114 and is sloping inwardly in a direction away from the front face 102, and thus the relief angle α for the flank is rendered positive.

As shown in FIGS. 3 to 5, the insert 100 is removably secured by a clamp screw 116 to a body 118 of the ball end mill with the rear face 104 mated with a recessed seat surface 120, in such a manner that an indexed one of the cutting edges 114 is so disposed as to extend outwardly beyond the front end and outer periphery of the end mill body 118, and that the leading end portion 114a of the indexed cutting edge 114 disposed adjacent to an axis O of the end mill body 118 is convexly curved when viewed axially of the end mill body 118. Besides, the axial rake angle θ for the indexed cutting edge 114 is rendered positive.

In the cutter insert described above, the leading end portion 114a of the indexed cutting edge 114 begins to engage a workpiece first, and then other portions of the cutting edge 114 begin to engage the workpiece as the end mill body 118 rotates. Accordingly, the cutting load increases gradually as the cutting operation proceeds, and a great load will not be exerted on the indexed cutting edge 114 at a time, so that the cutting edge 114 is less liable to breakage.

In such a prior art insert, however, since a positive relief angle α is imparted to each arcuate convex flank 108, it is impossible to define other cutting edges at the marginal ridges of the rear face 104, and therefore the insert is not economical. Besides, as shown in FIG. 2, an angle β defined by a leading end of the second wall 112 and a straight line tangent to the cutting edge 114 at its leading end is less than 90°, and hence the strength of the cutting edge 114 is not sufficiently high at its leading end. In addition, the flat wall 112 of the V-shaped notch 106 prevents a smooth discharge of chips during the cutting operation and causes the jamming or wedging of chips, so that the cutting edge 114 is liable to damage.

SUMMARY OF THE INVENTION

It is therefore an object of the present invention to provide a cutter insert which has a greater number of indexable cutting edges than a prior art insert does and in which each cutting edge is less susceptible to damage even at its leading end, and in which a smooth discharge of chips is ensured.

According to the present invention, there is provided an indexable cutter insert for a rotary cutter, comprising a plate defined by a front face, a rear face disposed generally parallel to the front face and plural pairs of first and second side faces disposed alternately and lying between the front and rear faces, each of the first and second side faces extending generally perpendicular to the front and rear faces, each of the first side faces being longer than each of the second side faces and generally arcuately convex as viewed in a direction perpendicular to the front face while each of the second side faces is generally planar, the plate having a plurality of generally arcuate convex front cutting edges each defined by the intersection of a respective one of the first side faces with the front face and a plurality of generally arcuate convex rear cutting edges each defined by the intersection of a respective one of the first side faces with the rear face, a front marginal surface portion of the front face disposed adjacent to and extending along each second side face being convexly curved so as to slope toward the rear face toward the second side face while a rear marginal surface portion of the rear face disposed adjacent to and extending along each second side face is convexly curved so as to slope toward the front face toward the second side face.

BRIEF DESCRIPTION OF THE DRAWINGS

FIG. 11 is a plan view of a modified cutter insert in accordance with the present invention; and FIG. 12 is a side elevation of the cutter insert of FIG. 11.

DESCRIPTION OF THE PREFERRED EMBODIMENTS OF THE INVENTION

Figure 1:
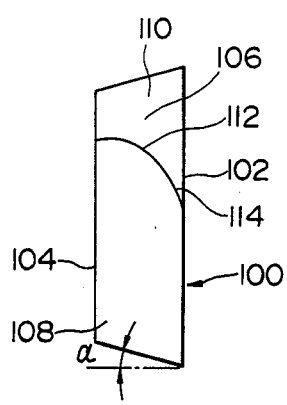
FIG. 1 is a side elevation of a conventional cutter insert.
Figure 2:
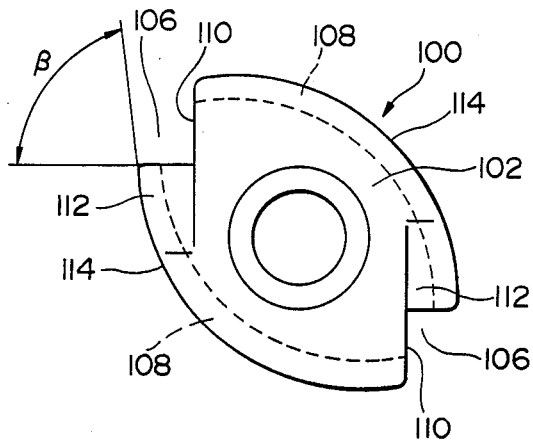
FIG. 2 is a plan view of the insert of FIG. 1.
Figure 3:
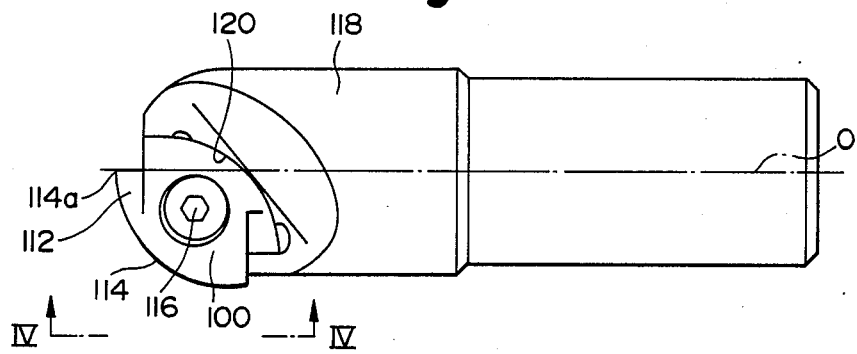
FIG. 3 is a front elevation of a ball end mill employing the insert of FIG. 1.
Figure 4:
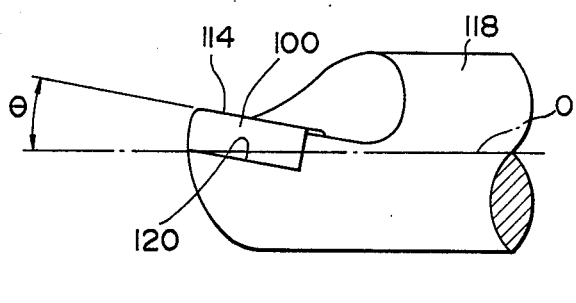
FIG. 4 is a side elevation view of a part of the end mill of FIG. 3.
Figure 5:
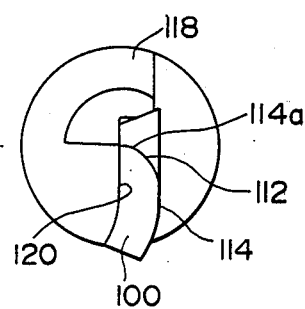
FIG. 5 is an end view of the end mill of FIG. 3.
Figure 6:
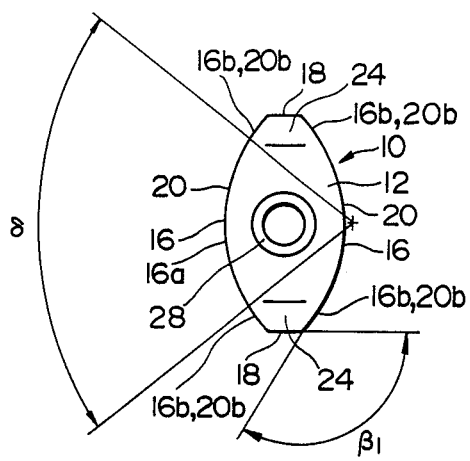
FIG. 6 is a plan view of a cutter insert provided in accordance with the present invention.
Figure 7:
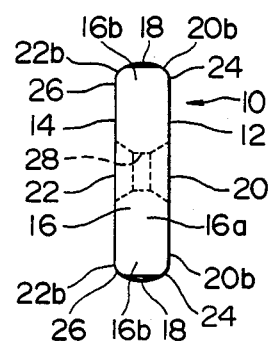
FIG. 7 is a side elevation of the cutter insert of FIG. 6.

FIGS. 6 and 7 show an indexable cutter insert 10 which comprises a plate of a generally elliptical shape defined by a front face 12, a rear face 14 disposed parallel to the front face 12 and two pairs of first and second side faces 16 and 18 disposed alternately and lying between the front and rear faces 12 and 14, each side face 16, 18 extending perpendicular to the front and rear faces 12 and 14. Each of the first side faces 16 is longer than each of the second side faces 18 and is convexly curved as viewed in a direction perpendicular to the front face 12. Each of the second side faces 18 is planar and intersects the first side faces 16 in such a manner that an angle $\beta_1$ defined by the second side face 18 and a plane tangent to the first side face 16 at its end is obtuse. The plate has a pair of generally arcuately convex front cutting edges 20 each defined by the intersection of a respective one of the first side faces 16 with the front face 12 and a pair of generally arcuately convex rear cutting edges 22 each defined by the intersection of a respective one of the first side faces 16 with the rear face 14. In the illustrated embodiment, each first side face 16 is comprised of an arcuate surface portion 16a which assumes a generally quadrantal shape having a central angle $\delta$ slightly smaller than 90° when viewed in a direction perpendicular to the front face, and a pair of planar surface portions 16b extending from the arcuate surface portion 16a so as to be tangential to the surface portion 16a at its opposite ends. Thus, each cutting edge 20, 22 is comprised of a first arcuate cutting edge portion 20a, 22a assuming a generally quadrantal shape as viewed in a direction perpendicular to the front face, and a pair of second cutting edge portions 20b, 22b each of which is straight as viewed in the same direction.

A front marginal surface portion 24 of the front face 12 disposed adjacent to and extending along each second side face 18 is convexly curved in such a manner as to slope toward the rear face 14 toward the second side face 18, whereby the second straight cutting edge portion 20b of the front cutting edge 20 is convexly curved as viewed in a side elevation. Similarly, a rear marginal surface portion 26 of the rear face 14 disposed adjacent to and extending along each second side face 18 is convexly curved in such a manner as to slope toward the front face 12 toward the second side face 18, whereby the second straight cutting edge portion 22b of the rear cutting edge 22 is also convexly curved as viewed in a side elevation. The insert plate has a central aperture 28 formed therethrough.

Figure 8:
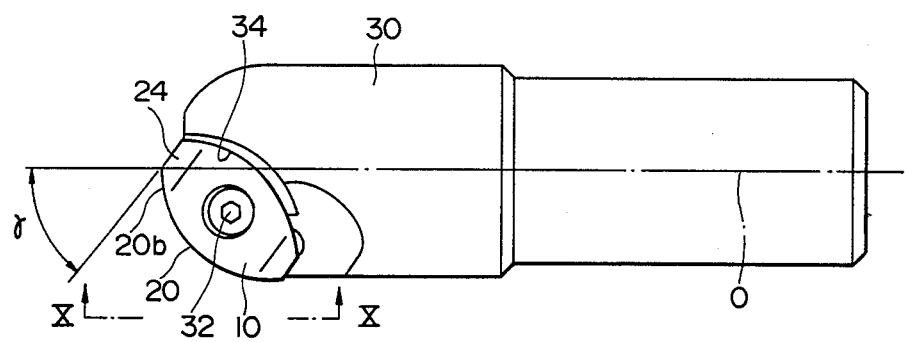
FIG. 8 is a front elevation of a ball end mill employing the insert of FIG. 6.
Figure 9:
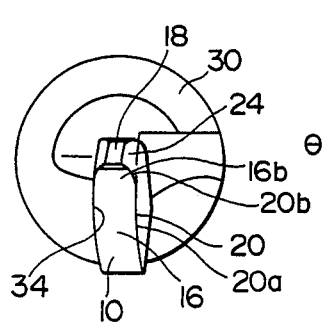
FIG. 9 is an end view of the end mill of FIG. 8.
Figure 10:
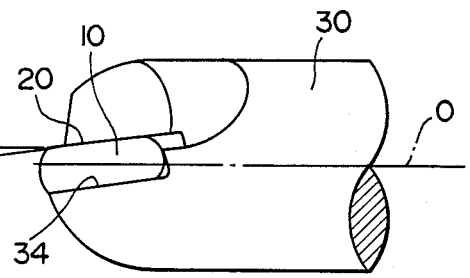
FIG. 10 is a side elevation of a part of the end mill of FIG. 8.

As shown in FIGS. 8 to 10, the cutter insert 10 is releasably secured to a body 30 of a ball end mill by a clamp screw 32 passing through the central aperture 28 into the body 30. Formed in a forward end portion of the body 30 is a chip pocket having a recessed flat seat surface 34 which is slightly inclined with respect to an axis O of rotation of the body 30 when viewed from the side of the insert. The insert 10 is attached to the body 30 with the rear face 14 mated with the seat surface 34 in such a manner that one of the front cutting edges 20 is indexed in a working position so as to extend outwardly slightly beyond the forward end portion of the body 30, and that the axial rake angle $\theta_1$ for the indexed cutting edge is rendered negative. As shown in FIG. 8, the front marginal portion 24 disposed adjacent to the axis O of the body is inclined with respect to the axis O of the body 30 at a prescribed angle $\gamma$ when viewed in a front elevation of the end mill, and thus one of the second cutting edge portions 20b of the cutting edge 20 is disposed so as to serve as a leading end portion thereof.

As described above, inasmuch as the rear cutting edges 22 are provided on the marginal ridges of the rear face 14, the insert 10 is very economical as compared with a prior art insert. In addition, by virtue of the provision of the convexly curved leading portion 20b, the cutting load increases gradually as the cutting operation proceeds, and therefore a great cutting load will not be exerted on the cutting edge 20 at a time. Further, in the above insert, the angle $\beta_1$ defined by the second side face 18 and the straight line tangent to the cutting edge 20 at its leading end is obtuse, and hence the strength of the cutting edge is substantially increased at its leading end. Therefore, even though a great load should be exerted on the cutting edge 20 at its leading end, the cutting edge 20 is less liable to damage. Further, the insert 10 does not include a wall like the flat wall 110 of the prior insert 100, and accordingly a smooth discharge of chips can be positively ensured.

In the illustrated embodiment, the indexed convexly curved cutting edge 20 includes the second cutting edge portions 20b which are straight as viewed in a direction perpendicular to the front face 12 but convexly curved as viewed in a direction along the second side face 18, and the insert 10 is attached to the body 30 with the negative axial angle $\theta_1$. With this construction, the second portion 20b of the cutting edge 20 can produce a generally hemispherical contour when the end mill body 30 is rotated about its axis O. Therefore, the insert 10 can machine or process a workpiece with a higher accuracy.

FIGS. 11 and 12 show a modified cutter insert 40 in accordance with the present invention which differs from the previous embodiment in that the plate is of a generally circular shape. The side periphery lying between front and rear faces 42 and 44 is comprised of three pairs of first longer convexly curved side face 46 and second flat short side face 47. The insert 40 includes three convexly curved front cutting edges 48 and three convexly curved rear cutting edges 50. Each first side face 46 is comprised of an arcuate surface portion 46a of a generally quadrantal shape and a pair of planar surface portions 46b extending from the first surface portion at opposite ends. Thus, each cutting edge 48, 50 is comprised of an arcuate cutting edge portion 48a, 50a of a generally quadrantal shape with a central angle $\delta$, and a pair of second cutting edge portions 48b, 50b each of which is straight as viewed in a plan.

As is the case with the previous embodiment, those marginal surface portions 52 of the front and rear faces 42 and 44 disposed adjacent to and extending along each second side face 47 are convexly curved as viewed in a side elevation along the second side face 47, and thus the second edge portion 48b, 50b is convexly curved as viewed in a side elevation.

In the insert 40 described above, the angle $\beta_2$ defined by the second side face 48 and the cutting edge 48, 50 is greater than the angle $\beta_1$ of the insert shown in FIGS. 6 and 7. Accordingly, the strength of the cutting edge at its leading end is further enhanced.

Obviously many modifications and variations of the present invention are possible in the light of the above teachings. It is therefore to be understood that within the scope of the appended claims, the invention may be practiced otherwise than as specifically described.

What is claimed is:

1. An indexable cutter insert for a rotary cutter, comprising a plate defined by a front face, a rear face disposed generally parallel to said front face and plural pairs of first and second side faces disposed alternately and lying between said front and rear face, each of said first and second side faces extending generally perpendicular to said front and rear faces, each of said first side faces being longer than each of said second side faces and generally arcuately convex as viewed in a directional perpendicular to said front face while each said second side face is generally planar, said plate having a plurality of generally arcuate convex front cutting edges each defined by the intersection of a respective one of said first side faces with said front face and a plurality of generally arcuate convex rear cutting edges each defined by the intersection of a respective one of said first side faces with said rear face, a front marginal surface portion of said front face disposed adjacent to and extending along each second side face being convexly curved so as to slope toward said rear face toward said second side face while a rear marginal surface portion of said rear face disposed adjacent to and extending along each second side face is convexly curved so as to slope toward said front face toward said second side face, and said plate having a generally elliptical shape so as to have two pairs of said first and second side faces, and surface portion assuming a generally quadrantal shape as viewed in the direction perpendicular to said front face and a pair of planar surface portions extending from said arcuate surface portion so as to be tangential to said arcuate surface portion at opposite ends thereof, whereby each said cutting edge consists of a first cutting edge portion assuming a generally quadrantal shape as viewed in a direction perpendicular to said front face and a pair of second cutting edge portions each of which is straight as viewed in the direction perpendicular to said front face but is convexly curved as viewed in a side elevation of the insert.

2. A cutter insert according to claim 1, in which an angle defined by a straight line tangent each to said cutting edge at one end thereof and each said second side face is obtuse.

* * * * *